United States Patent
Chen et al.

(10) Patent No.: US 8,456,580 B2
(45) Date of Patent: *Jun. 4, 2013

(54) THREE-DIMENSIONAL DISPLAY AND DISPLAYING METHOD THEREOF

(75) Inventors: Li Chen, New Taipei (TW); Chia-Chih Kao, Taoyuan County (TW); Chao-Yuan Chen, Hsinchu County (TW); Ken-Yu Liu, Miaoli County (TW); Wen-Hao Hsu, Hsinchu County (TW); Jenn-Jia Su, Chiayi County (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/108,003

(22) Filed: May 16, 2011

(65) Prior Publication Data

US 2011/0216253 A1     Sep. 8, 2011

Related U.S. Application Data

(63) Continuation-in-part of application No. 12/814,498, filed on Jun. 14, 2010, now Pat. No. 8,379,158.

(30) Foreign Application Priority Data

Mar. 8, 2010   (TW) ................................. 99106609 A
Jan. 20, 2011  (TW) ............................... 100102041 A (51) Int. Cl.
   *G02F 1/1335*   (2006.01)

(52) U.S. Cl.
   USPC .............................. 349/15; 349/117; 348/51

(58) Field of Classification Search
   USPC ................ 349/15, 117–119, 139; 348/42–60;
                                                    359/462–477
   See application file for complete search history.

(56) References Cited

U.S. PATENT DOCUMENTS

| 7,589,810 B2 * | 9/2009 | Sugiyama | 349/117 |
| 7,821,583 B2 * | 10/2010 | Yeh et al. | 349/15 |
| 7,916,221 B2 * | 3/2011 | Daiku | 349/15 |
| 2011/0157698 A1 * | 6/2011 | Yoshimi | 359/462 |

FOREIGN PATENT DOCUMENTS

CN          101183177          5/2008

* cited by examiner

*Primary Examiner* — Dung Nguyen
(74) *Attorney, Agent, or Firm* — Jianq Chyun IP Office (57) ABSTRACT

A three-dimensional display including a display panel and a phase retardation film is provided. The display panel has a plurality of first pixel regions and a plurality of second pixel regions arranged in arrays. The phase retardation film is configured on a surface of the display panel. Here, the phase retardation film has a plurality of first retardation regions and a plurality of second retardation regions that are arranged alternately. The first retardation regions have the same phase retardation, the second retardation regions have the same phase retardation, and the phase retardation of the first retardation regions is different from that of the second retardation regions. All the regions of the phase retardation film have the same optical transmittance. A displaying method adaptable to the three-dimensional display is also provided.

10 Claims, 6 Drawing Sheets

THREE-DIMENSIONAL DISPLAY AND DISPLAYING METHOD THEREOF

CROSS-REFERENCE TO RELATED APPLICATION

This application is a continuation-in-part application of and claims the priority benefit of a prior application Ser. No. 12/814,498, filed on Jun. 14, 2010, now pending. The prior application Ser. No. 12/814,498 claims the priority benefit of Taiwan application serial no. 99106609, filed on Mar. 8, 2010. This application also claims the priority benefit of a Taiwan application serial no. 100102041, filed on Jan. 20, 2011. The entirety of each of the above-mentioned patent applications is hereby incorporated by reference herein and made a part of this specification.

BACKGROUND OF THE INVENTION

1. Field of the Invention

The invention generally relates to a display and a displaying method thereof, and more particularly, to a three-dimensional (3D) display and a displaying method of the 3D display.

2. Description of Related Art

People have been increasing their demands both materially and spiritually along with the development of technologies. Spiritually, people intend to visualize their wild imagination through display devices so as to achieve the most vivid experience. Thus, how to present 3D images or videos on display devices has become a major objective in display device development. According to the operating principle of an existing 3D display, a phase retardation film with two types of phase retardation regions is attached to a display panel, such that light provided by pixel regions for displaying a left-eye image and light provided by pixel regions for displaying a right-eye image are in different polarization states. Accordingly, the left-eye image and the right-eye image are respectively transmitted to the left eye and the right eye through a pair of head goggles and form a 3D image in a user's brain.

However, in order to prevent the light provided by the pixel regions from passing through incorrect phase retardation regions in a gradient manner and accordingly presenting an incorrect image to the user, a black matrix has to be configured between the two types of phase retardation regions of the phase retardation film. As a result, the brightness and viewing angle range of the display device for displaying two-dimensional (2D) images are significantly reduced, and the costs of the phase retardation film are increased.

SUMMARY OF THE INVENTION

Accordingly, the invention is directed to a 3D display, wherein all regions of a phase retardation film in the 3D display have the same optical transmittance, such that high display brightness and a wide viewing angle range of the 3D display are retained while 2D images are displayed on the 3D display.

The invention is further directed to a displaying method by applying which 3D images or 2D images are selectively displayed according to a user's requirement through appropriate arrangement of components on a display panel.

In an embodiment of the invention, a 3D display including a display panel and a phase retardation film is provided. The display panel has a plurality of first pixel regions and a plurality of second pixel regions that are arranged in arrays. The phase retardation film is configured on a surface of the display panel. Here, the phase retardation film has a plurality of first retardation regions and a plurality of second retardation regions, and the first and second retardation regions are arranged alternately. The first retardation regions have the same phase retardation, the second retardation regions have the same phase retardation, and the phase retardation of the first retardation regions is different from that of the second retardation regions. All of the regions of the phase retardation film have the same optical transmittance.

According to an embodiment of the invention, each of the first pixel regions corresponding to any one of the first retardation regions or any one of the second retardation regions has a first area, each of the second pixel regions corresponding to both one of the first retardation regions and an adjacent one of the second retardation regions has a second area, and each of the first areas is greater than or substantially equal to each of the second areas.

According to an embodiment of the invention, each of the first areas is twice as large as each of the second areas, for instance.

According to an embodiment of the invention, the display panel includes an active device array substrate, a color filter substrate, and a liquid crystal layer. The active device array substrate has an active device array. The color filter substrate has a black matrix and a plurality of color filter films. The black matrix has a plurality of openings. Each of the openings corresponds to one of the first pixel regions or one of the second pixel regions, and each of the openings corresponds to one of the color filter films. The liquid crystal layer is configured between the active device array substrate and the color array substrate. Here, the 3D display can further include a polarizer configured on an outer surface of the color filter substrate, and the phase retardation film is configured on the polarizer. Alternatively, the polarizer can be configured on an inner surface of the color filter substrate, and the phase retardation film is configured between the polarizer and the color filter substrate.

According to an embodiment of the invention, the display panel includes an active device array substrate, an opposite substrate, and a liquid crystal layer. The active device array substrate has an active device array, a black matrix, and a plurality of color filter films. The black matrix has a plurality of openings. Each of the openings corresponds to one of the first pixel regions or one of the second pixel regions, and each of the openings corresponds to one of the color filter films. The liquid crystal layer is configured between the active device array substrate and the opposite substrate. Here, the 3D display can further include a polarizer configured on an outer surface of the opposite substrate, and the phase retardation film is configured on the polarizer. Alternatively, the polarizer can be configured on an inner surface of the opposite substrate, and the phase retardation film is configured between the polarizer and the opposite substrate.

According to an embodiment of the invention, the phase retardation of the first retardation regions is 0, $\lambda/4$, $-\lambda/4$, $3\lambda/4$, $-3\lambda/4$, $\lambda/2$, or $-\lambda/2$, for instance, and the phase retardation of the second retardation regions is 0, $\lambda/4$, $-\lambda/4$, $3\lambda/4$, $\lambda/2$, or $-\lambda/2$, for instance.

According to an embodiment of the invention, the display panel is a polymer stabilized alignment liquid crystal display (PSA LCD) panel, for instance.

In an embodiment of the invention, a displaying method of the aforesaid 3D display includes following steps. When the 3D display operates under a 2D display mode, a 2D image is displayed with use of all of the first and second pixel regions of the display panel. When the three-dimensional display operates under a three-dimensional display mode, an image is displayed with use of the first pixel regions of the display panel, and the second pixel regions are in a dark state.

Based on the above, in the 3D display and the displaying method of the 3D display, an image displayed by the display panel is converted into an image with 3D information by using the first retardation regions and the second retardation regions of the phase retardation film which have different phase retardations, such that a 3D image can be presented to a user through a pair of head goggles. On the other hand, since the first retardation regions and the second retardation regions of the phase retardation film which have different phase retardations have the same optical transmittance but do not have any light-blocking component (e.g., a black matrix), high brightness and a wide viewing angle range can be achieved by the 3D display and the displaying method of the 3D display as provided in the invention while 2D images are displayed.

In order to make the aforementioned and other features and advantages of the invention more comprehensible, embodiments accompanying figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DESCRIPTION OF EMBODIMENTS

The invention provides a 3D display that can display 2D or 3D images according to actual requirement. Besides, all the regions of a phase retardation film which is attached to a display panel of the 3D display have the same optical transmittance, and no black matrix is configured between two different types of phase retardation regions. Hence, high brightness and a wide viewing angle range can be achieved by the 3D display when 2D images are displayed. Several embodiments of the invention are provided below to elaborate the pixel structure of the invention with reference to the accompanying drawings.

Figure 1:
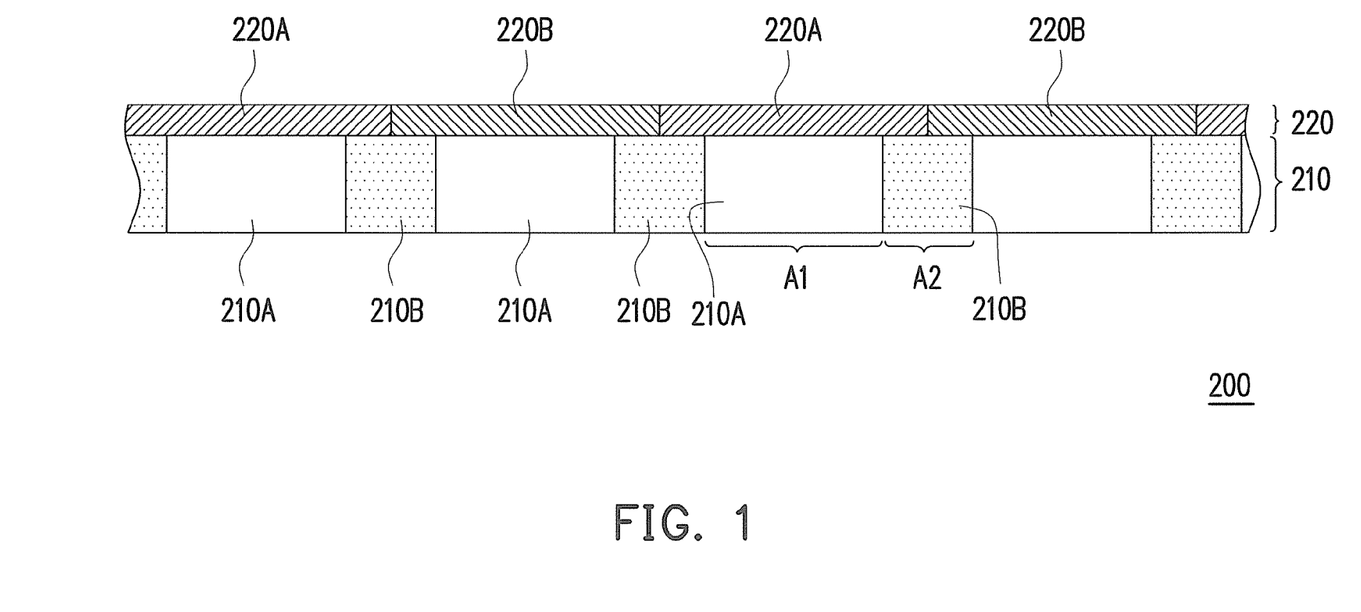
FIG. 1 is a schematic cross-sectional view illustrating a 3D display according to an embodiment of the invention.

FIG. 1 is a schematic cross-sectional view illustrating a 3D display according to an embodiment of the invention. With reference to FIG. 1, the 3D display 200 includes a display panel 210 and a phase retardation film 220. The display panel 210 has a plurality of first pixel regions 210A and a plurality of second pixel regions 210B, and the first and second pixel regions 210A and 210B are arranged in arrays. The phase retardation film 220 is configured on the surface of the display panel 210. To be specific, the phase retardation film 220 has a plurality of first retardation regions 220A and a plurality of second retardation regions 220B. The first retardation regions 220A and the second retardation regions 220B are alternatively arranged. The first retardation regions 220A have the same phase retardation, the second retardation regions 220B have the same phase retardation, and the phase retardation of the first retardation regions 220A is different from that of the second retardation regions 220B. In detail, the first retardation regions 220A and the second retardation regions 220B are respectively $\lambda/4$ phase retardation regions and $3\lambda/4$ phase retardation regions, for instance, such that an image displayed by the display panel 210 can be in different polarization states (e.g., levorotary circular polarized light and dextrorotary circular polarized light) when it passes through the phase retardation film 220. Thereby, images in different polarization states are respectively transmitted to a user's left eye and right eye, so as to form a 3D image in the user's brain through a pair of head goggles.

According to this embodiment, a $\lambda/4$ phase retardation region refers to the first retardation region 220A or the second retardation region 220b capable of providing approximately $\lambda/4$ phase retardation, while a $3\lambda/4$ phase retardation region refers to the first retardation region 220A or the second retardation region 220b capable of providing approximately $3\lambda/4$ phase retardation.

The phase retardation of the first retardation regions 220A need be different from the phase retardation of the second retardation regions 220B in this embodiment. For instance, the phase retardation of the first retardation regions 220A can be 0, $\lambda/4$, $-\lambda/4$, $3\lambda/4$, $-3\lambda/4$, $\lambda/2$, or $\lambda/2$, and the phase retardation of the second retardation regions 220B can be 0, $\lambda/4$, $-\lambda/4$, $3\lambda/4$, $-3\lambda/4$, $\lambda/2$, or $-\lambda/2$. In an embodiment of the invention, the phase retardations of the first and second retardation regions 220A and 220B can respectively be $\lambda/4$ and $-\lambda/4$. In another embodiment of the invention, the phase retardations of the first and second retardation regions 220A and 220B can respectively be $\lambda/2$ and $-\lambda/2$. In still another embodiment of the invention, the phase retardations of the first and second retardation regions 220A and 220B can respectively be 0 and $\lambda/4$ or 0 and $-\lambda/4$. In still another embodiment of the invention, the phase retardations of the first and second retardation regions 220A and 220B can respectively be 0 and $\lambda/2$ or 0 and $-\lambda/2$. Note that the phase retardations of the first and second retardation regions 220A and 220B is interchangeable.

In particular, all of the first and second retardation regions 220A and 220B of the phase retardation film 220 have the same optical transmittance. In other words, in the 3D display 200 of the invention, there is no light-blocking component (e.g., a black matrix 230) configured in the phase retardation film 220, and the phase retardation film 220 is simply composed of the first retardation regions 220A and the second retardation regions 220B. As such, the image displayed by the display panel 210 can pass through the phase retardation film 220 smoothly, and the brightness of the image or the viewing angle range are not reduced due to the existence of the light-blocking component, such as the black matrix 230. Consequently, the 3D display 200 in the invention achieves high brightness and a wide viewing angle range.

As indicated in FIG. 1, the correlation between the first and second pixel regions of the display panel and the first and second retardation regions of the phase retardation film are further described below. According to this embodiment shown in FIG. 1, the first pixel regions 210A are located completely within the coverage of the first retardation regions 220A or the second retardation regions 220B, while the second pixel regions 210B cover the border between the first retardation regions 220A and the second retardation regions 220B. In other words, the first pixel regions 210A completely correspond to the same retardation regions. For instance, the first pixel regions 210A completely correspond to the first retardation regions 220A or the second retardation regions 220B, and the second pixel regions 210B correspond to two different types of retardation regions. Therefore, when the 3D display 200 operates under a 3D display mode, the 3D display 200 controls the second pixel regions 210B to be in a dark state, such that light is prevented from passing through incorrect phase retardation regions in a gradient manner and accordingly presenting an incorrect image to the user. Since it is not necessary to configure the black matrix 230 (as shown in FIG. 2 and FIG. 3) between the two types of phase retardation regions of the phase retardation film 220, the manufacturing costs of the phase retardation film 220 can be reduced.

In addition, in consideration of increasing the display brightness of the 3D display operating under the 3D display mode and the display quality of the 3D display operating under the 2D display mode, the areas of the first pixel regions 210A and the second pixel regions 210B can be specifically designed. To be more specific, each of the first pixel regions 210A corresponding to any one of the first retardation regions 220A or any one of the second retardation regions 220B has a first area A1, and each of the second pixel regions 210B corresponding to both one of the first retardation regions 220A and an adjacent one of the second retardation regions 220B has a second area A2. Preferably, each first area A1 is greater than or substantially equal to each second area A2. In this embodiment, each first area A1 is preferably twice as large as each second area A2.

It should be mentioned that the display panel 210 may be an LCD panel or any other display panel with a polarizer attached to the surface of the display panel. For instance, the LCD panel can be comprised of an active device array substrate, a color filter substrate, and a liquid crystal layer, or the LCD panel can have a color filter on array (COA) substrate. Various components of the display panel and the configuration of these components and the phase retardation film are described with reference to the following embodiments of the invention.

Figure 2A:
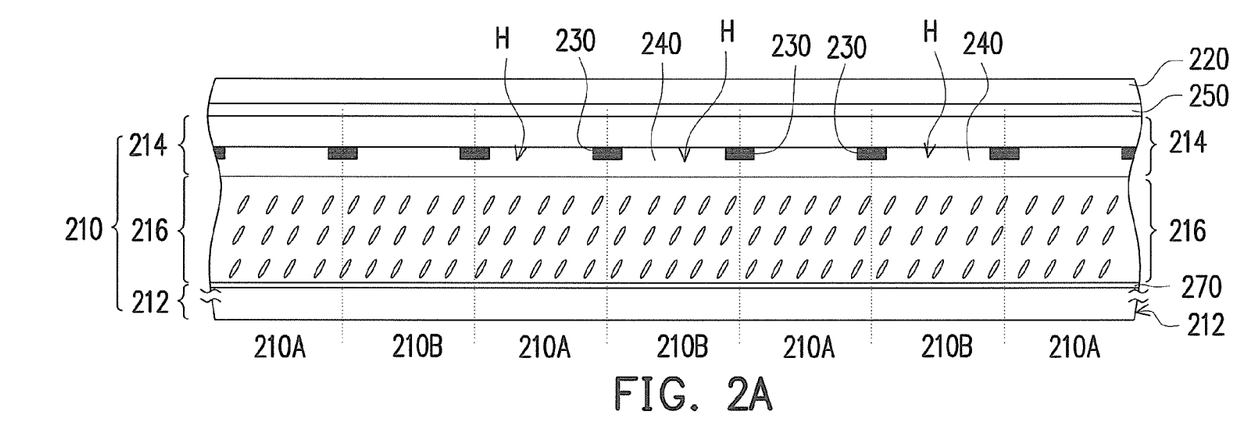
FIG. 2A and FIG. 2B are schematic cross-sectional views respectively illustrating a 3D display according to an embodiment of the invention.
Figure 2B:
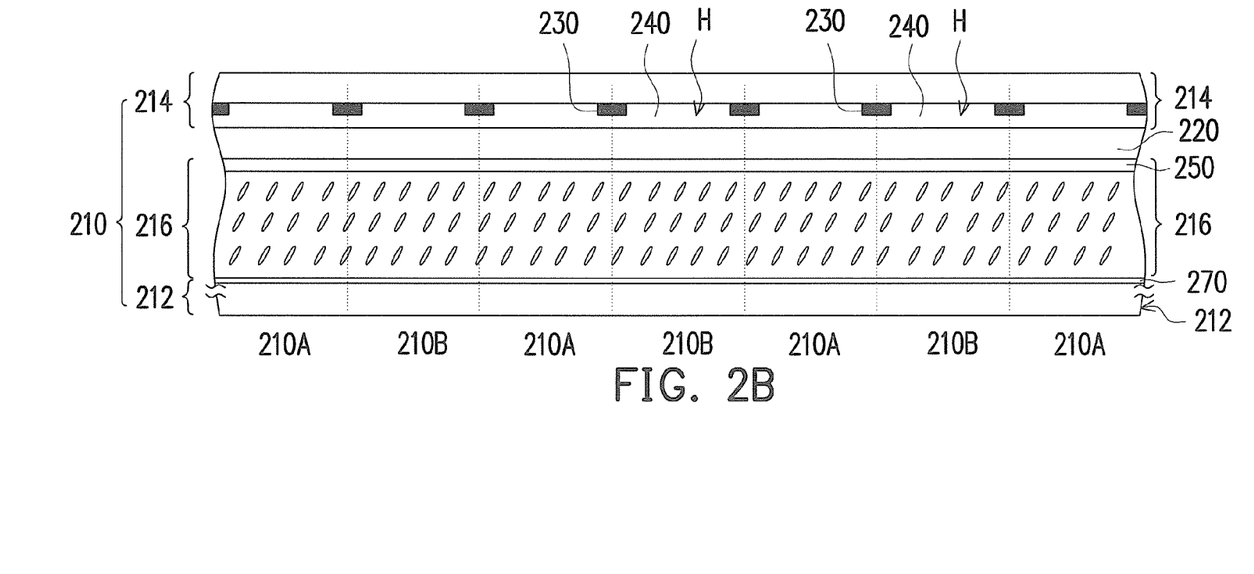

FIG. 2A and FIG. 2B are schematic cross-sectional views respectively illustrating a 3D display according to an embodiment of the invention. Here, the display panel is composed of an active device array substrate, a color filter substrate, and a liquid crystal layer. With reference to FIG. 2A, the display panel 210 includes an active device array substrate 212, a color filter substrate 214, and a liquid crystal layer 216. The active device array substrate 212 has an active device array 270. The color filter substrate 214 has a black matrix 230 and a plurality of color filter films 240. The black matrix 230 has a plurality of openings H, and each of the openings H corresponds to a first pixel region 210A or a second pixel region 210B. Besides, each of the openings H corresponds to one of the color filter films 240, such as a red color filter film, a green color filter film, or a blue color filter film. The liquid crystal layer 216 is configured between the active device array substrate 212 and the color filter substrate 214. Besides, the 3D display 200 can further include a polarizer 250. As shown in FIG. 2A, the polarizer 250 is configured on an outer surface of the color filter substrate 214, and the phase retardation film 220 is configured on the polarizer 250. Certainly, as shown in FIG. 2B, the polarizer 250 can also be configured on the inner surface of the color filter substrate 214, i.e., the polarizer 250 and the phase retardation film 220 can be configured at two opposite sides of the color filter substrate 214, respectively. Note that the location of the polarizer 250 is not limited in the invention.

Figure 3A:
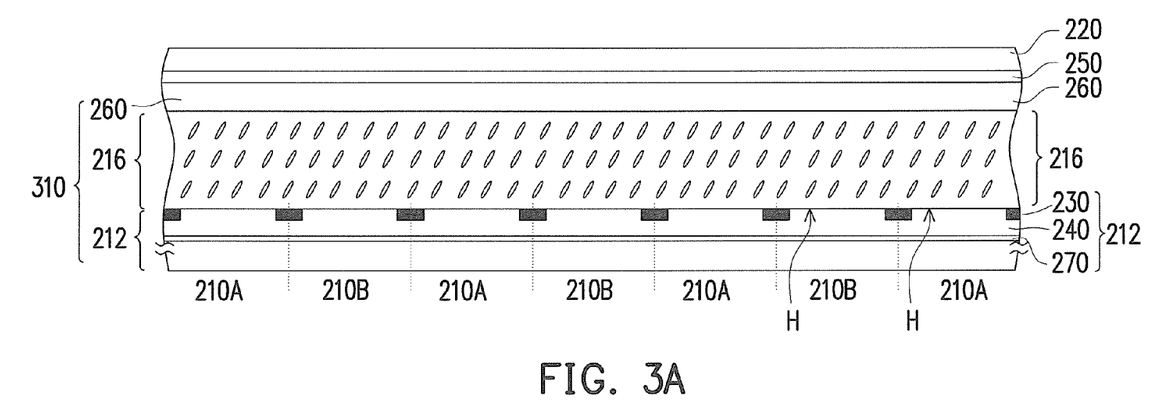
FIG. 3A and FIG. 3B are schematic cross-sectional views respectively illustrating a 3D display according to an embodiment of the invention.
Figure 3B:
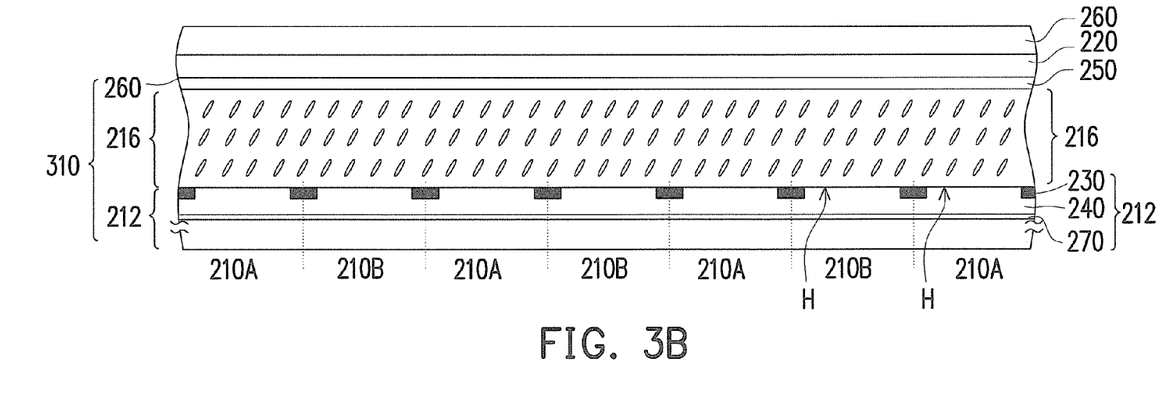

FIG. 3A and FIG. 3B are schematic cross-sectional views respectively illustrating a 3D display according to an embodiment of the invention. Here, the display panel 310 has a COA substrate. As shown in FIG. 3A, the display panel 310 includes an active device array substrate 212, an opposite substrate 260, and a liquid crystal layer 216. In this embodiment, the active device array substrate 212 has an active device array 270, a black matrix 230, and a plurality of color filter films 240. The black matrix 230 has a plurality of openings H, and each of the openings H corresponds to a pixel region. Here, the pixel region refers to a first pixel region 210A or a second pixel region 210B, for instance. Besides, each of the openings H corresponds to one of the color filter films 240. The liquid crystal layer 216 is configured between the active device array substrate 212 and the opposite substrate 260. In addition, as indicated in FIG. 3A, the polarizer 250 of the 3D display 200 can be configured on the outer surface of the opposite substrate 260, and the phase retardation film 220 can be configured on the polarizer 250. Undoubtedly, as shown in FIG. 3B, the polarizer 250 can also be configured on the inner surface of the opposite substrate 260, and the phase retardation film 220 can be configured between the polarizer 250 and the opposite substrate 260. The location of the polarizer 250 is not limited in the invention.

It should be mentioned that the type of the display panel is not limited in the invention. For example, the display panel can be an in-plane switching (IPS) LCD panel, a multi-domain vertical alignment (MVA) LCD panel, a twisted nematic (TN) LCD panel, or a polymer stabilized alignment (PSA) LCD panel. The invention is further described below by taking the PSA LCD panel as an example.

Figure 4:
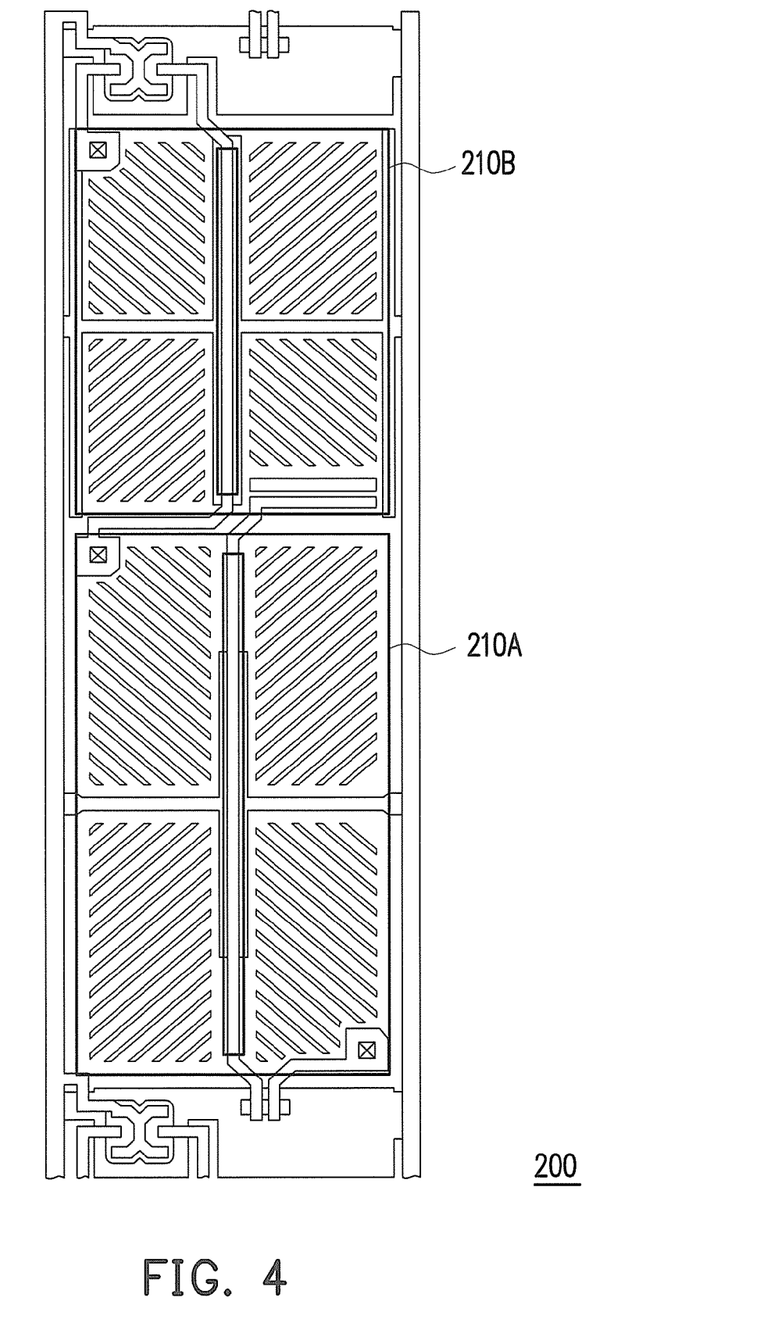
FIG. 4 is a partial top view illustrating a display panel of a 3D display according to an embodiment of the invention, wherein the display panel is a PSA LCD panel.
Figure 5A:
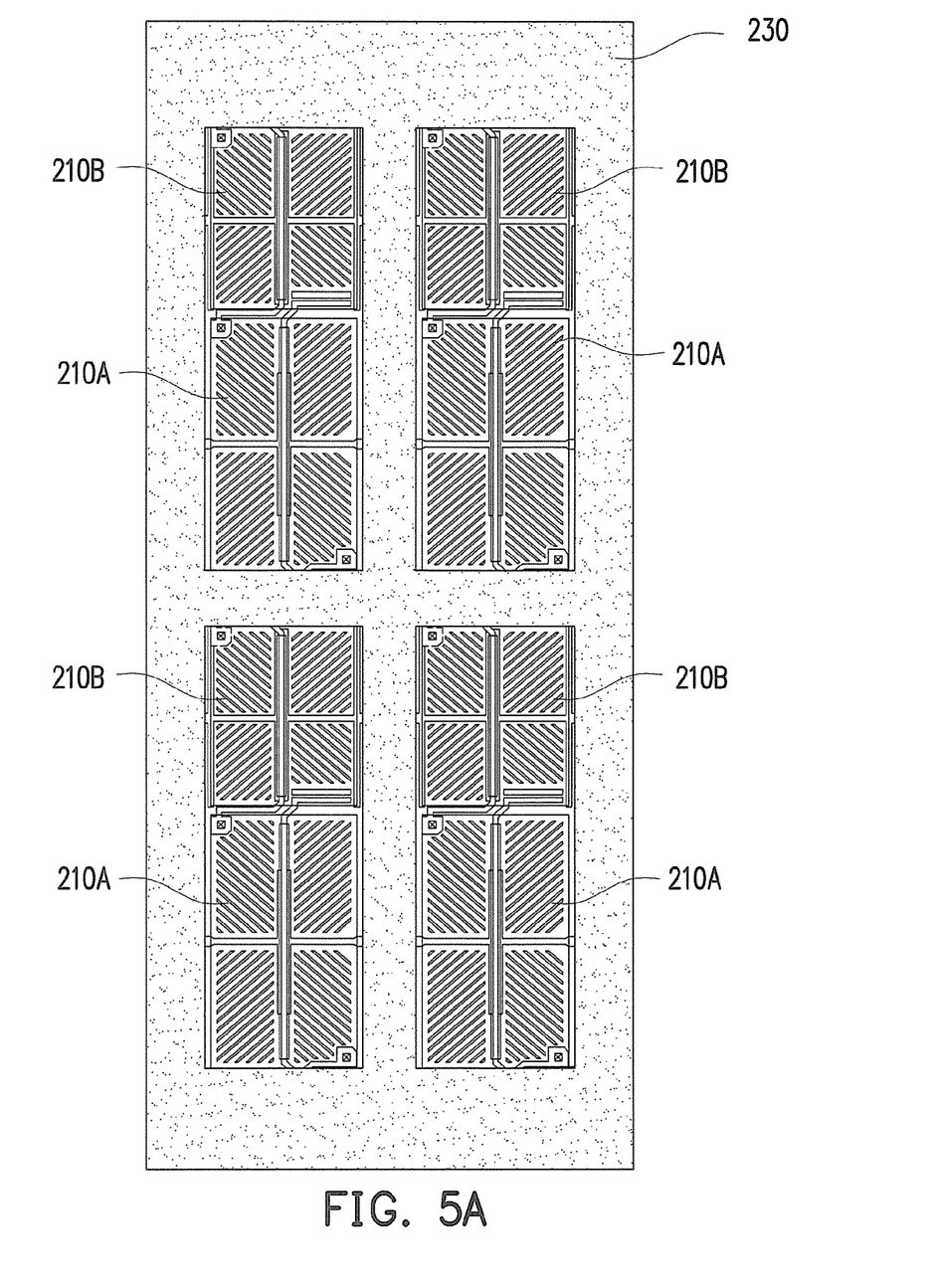
FIG. 5A and FIG. 5B are schematic views illustrating a 3D display with the display panel depicted in FIG. 4, wherein the 3D display respectively operated under a two-dimensional display mode and a three-dimensional display mode.
Figure 5B:
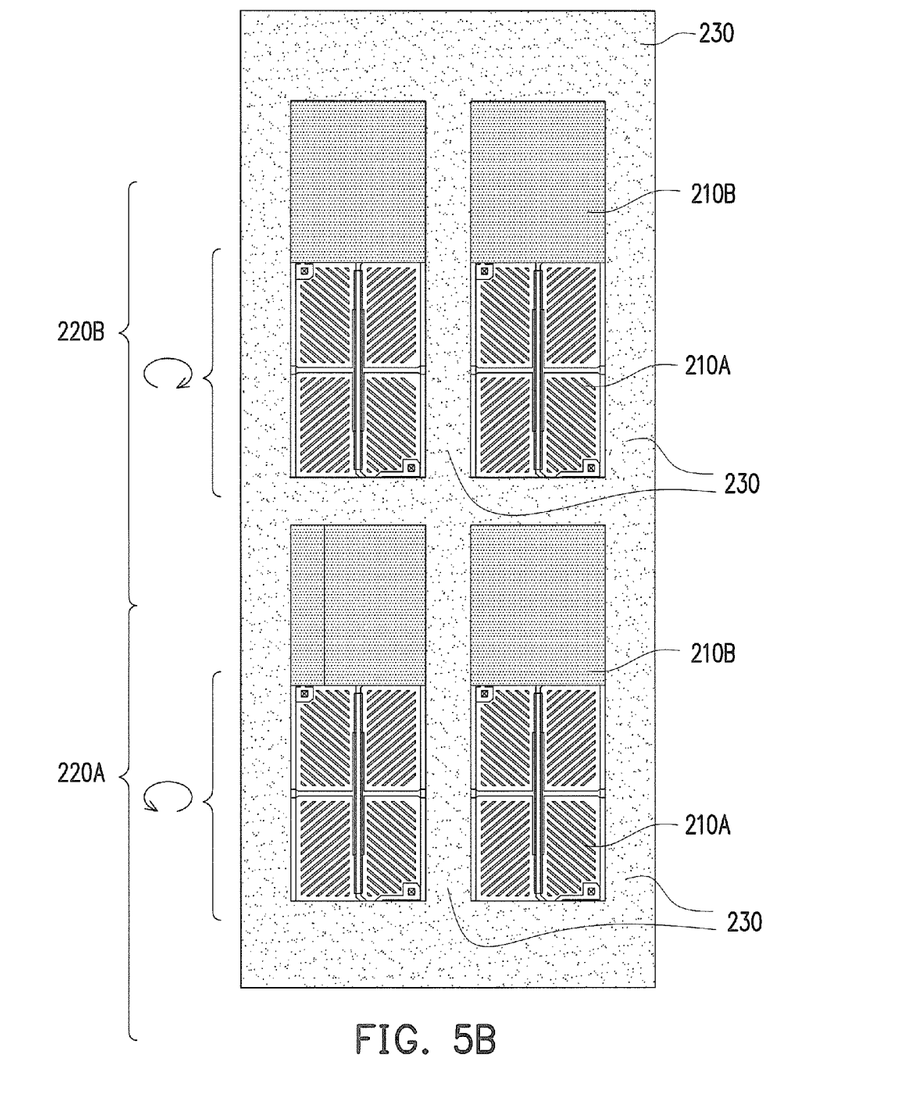

FIG. 4 is a partial top view illustrating a display panel of a 3D display according to an embodiment of the invention. Here, the display panel is a PSA LCD panel. In FIG. 4, one first pixel region 210A and one second pixel region 210B are exemplarily illustrated. FIG. 5A and FIG. 5B are schematic views illustrating a 3D display with the display panel depicted in FIG. 4, wherein the 3D display is respectively operating under a 2D display mode and a 3D display mode. As shown in FIG. 4, the display panel 210 has a first pixel region 210A and a second pixel region 210B. In the following embodiment, a displaying method adaptable to a 3D display is described with reference to FIG. 4, FIG. 5A, and FIG. 5B by taking the display panel illustrated in FIG. 4 as an example. To clearly describe the invention, the structures of the first and second pixel regions 210A and 210B, the first and second retardation regions 220A and 220B, and the black matrix 230 in the display panel 210 are schematically depicted in FIG. 5A and FIG. 5B, while other possible components are omitted therein.

As indicated in FIG. 5A, when the 3D display 200 operates under the 2D display mode, a 2D image is displayed on the 3D display 200 with use of all the first and second pixel regions 210A and 210B of the display panel 210. Since all the retardation regions of the phase retardation film 220 in the 3D display 200 have the same optical transmittance, and no light-blocking component (e.g., a black matrix) is configured in the phase retardation film 220, the 3D display 200 accomplishes high brightness and a wide viewing angle range when the 3D display 200 operates under the 2D display mode.

By contrast, with reference to FIG. 5B, when the 3D display 200 operates under the 3D display mode, the 3D display 200 controls the second pixel regions 210B corresponding to both types of retardation regions to be in a dark state, and an image is displayed on the 3D display 200 with use of all the first pixel regions 210A of the display panel 210. The image displayed by the first pixel regions 210A passes through the phase retardation film 220 having different phase retardations and then is in different polarization states after it respectively passes through the first retardation regions 220A and the second retardation regions 220B. Here, the first retardation regions 220A refer to $\lambda/4$ phase retardation regions, for instance, and the second retardation regions 220B refer to $3\lambda/4$ phase retardation regions, for instance. When the image displayed by the first pixel regions 210A passes through the $\lambda/4$ phase retardation regions and the $3\lambda/4$ phase retardation regions, the image is in different polarization states (e.g., levorotary circular polarized light and dextrorotary circular polarized light), such that a 3D image can be observed by the user through a pair of head goggles.

According to an embodiment, under the 2D display mode, the first pixel regions 210A and the second pixel regions 210B respectively have a switch device and display different information. Namely, the first pixel regions 210A and the second pixel regions 210B respectively serve as an independent pixel unit (not shown). However, according to another embodiment, under the 2D display mode, the first pixel regions 210A and the second pixel regions 210B display an image all together and collectively serve as a set of pixel units (including primary and secondary display units). In this case, the first pixel regions 210A having a relatively large aperture ratio act the primary display units, while the second pixel regions 210B act as the secondary display units. Thereby, the color washout phenomenon occurring when a 2D image is displayed is reduced.

In light of the foregoing, in the 3D display and the displaying method of the 3D display, the first and second retardation regions of the phase retardation film having different phase retardations have the same optical transmittance in the invention, such that not only 3D images can be displayed, the high image display brightness and the wide viewing angle range can also be achieved by the 3D display and by applying the displaying method when 2D images are displayed.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A three-dimensional display comprising:
   a display panel having a plurality of first pixel regions and a plurality of second pixel regions, the first pixel regions and the second pixel regions being arranged in arrays; and
   a phase retardation film configured on a surface of the display panel and having a plurality of first retardation regions and a plurality of second retardation regions, the first retardation regions and the second retardation regions being arranged alternately, wherein the first retardation regions have a same phase retardation, the second retardation regions have a same phase retardation, the phase retardation of the first retardation regions is different from the phase retardation of the second retardation regions, and all of the first retardation regions and the second retardation regions of the phase retardation film have same transmitted light through the first retardation regions and the second retardation regions, each of the first pixel regions corresponding to any one of the first retardation regions or any one of the second retardation regions has a first area, each of the second pixel regions corresponding to both one of the first retardation regions and an adjacent one of the second retardation regions has a second area, and each of the first areas is greater than each of the second areas, the phase retardation of the first retardation regions is $0, \lambda/4, -\lambda/4, 3\lambda/4, -3\lambda/4, \lambda/2,$ or $-\lambda/2$, and the phase retardation of the second retardation regions is $0, \lambda/4, -\lambda/4, 3\lambda/4, -3\lambda/4, \lambda/2,$ or $-\lambda/2$.

2. The three-dimensional display as claimed in claim 1, wherein each of the first areas is twice as large as each of the second areas.

3. The three-dimensional display as claimed in claim 1, wherein the display panel comprises:
   an active device array substrate having an active device array;
   a color filter substrate having a black matrix and a plurality of color filter films, wherein the black matrix has a plurality of openings, each of the openings corresponds to one of the first pixel regions or one of the second pixel regions, and each of the openings corresponds to one of the color filter films respectively; and
   a liquid crystal layer configured between the active device array substrate and the color filter substrate.

4. The three-dimensional display as claimed in claim 3, further comprising a polarizer configured on an outer surface of the color filter substrate, the phase retardation film being configured on the polarizer.

5. The three-dimensional display as claimed in claim 3, further comprising a polarizer configured on an inner surface of the color filter substrate, the phase retardation film being configured between the polarizer and the color filter substrate.

6. The three-dimensional display as claimed in claim 1, wherein the display panel comprises:
   an active device array substrate having an active device array, a black matrix, and a plurality of color filter films, wherein the black matrix has a plurality of openings, each of the openings corresponds to one of the first pixel regions or one of the second pixel regions, and each of the openings corresponds to one of the color filter films;
   an opposite substrate; and
   a liquid crystal layer configured between the active device array substrate and the opposite substrate.

7. The three-dimensional display as claimed in claim 6, further comprising a polarizer configured on an outer surface of the opposite substrate, the phase retardation film being configured on the polarizer.

8. The three-dimensional display as claimed in claim 6, further comprising a polarizer configured on an inner surface of the opposite substrate, the phase retardation film being configured between the polarizer and the opposite substrate.

9. The three-dimensional display as claimed in claim 1, wherein the display panel is a polymer stabilized alignment liquid crystal display panel.

10. A displaying method of the three-dimensional display as claimed in claim 1, the displaying method comprising:
   displaying a two-dimensional image with use of all of the first and second pixel regions of the display panel when the three-dimensional display operates under a two-dimensional display mode; and
   displaying an image with use of the first pixel regions of the display panel when the three-dimensional display operates under a three-dimensional display mode, wherein the second pixel regions are in a dark state.

* * * * *